(12) United States Patent
Sweazey

(10) Patent No.: US 8,225,097 B2
(45) Date of Patent: Jul. 17, 2012

(54) ANCHOR POINT-BASED DIGITAL CONTENT PROTECTION

(75) Inventor: Paul Marvin Sweazey, Lyons, CO (US)

(73) Assignee: Seagate Technology LLC, Cupertino, CA (US)

( * ) Notice: Subject to any disclaimer, the term of this patent is extended or adjusted under 35 U.S.C. 154(b) by 790 days.

(21) Appl. No.: 12/360,774

(22) Filed: Jan. 27, 2009

(65) Prior Publication Data

US 2009/0193254 A1 Jul. 30, 2009

Related U.S. Application Data

(60) Provisional application No. 61/024,174, filed on Jan. 28, 2008.

(51) Int. Cl.
*H04L 9/00* (2006.01)

(52) U.S. Cl. .......................... 713/175; 380/44; 380/284

(58) Field of Classification Search .................. 380/284; 713/177

See application file for complete search history.

(56) References Cited

U.S. PATENT DOCUMENTS

| 7,778,417 B2 * | 8/2010 | Rutkowski et al. ........... 380/201 |
| 2006/0282681 A1 * | 12/2006 | Scheidt et al. ................ 713/186 |
| 2008/0098481 A1 * | 4/2008 | Lee et al. ........................ 726/26 |
| 2009/0016533 A1 * | 1/2009 | Jung et al. ..................... 380/277 |

* cited by examiner

*Primary Examiner* — Matthew Smithers
(74) *Attorney, Agent, or Firm* — Cesari & Reed, LLP; Kirk A. Cesari

(57) ABSTRACT

Digital content protection can be effectively implemented through use of an anchor point and binding records in a user domain. An anchor point domain may include a secure anchor point, and data storage to store digital property instances and rights objects. The secure anchor point may be configured to receive a title pre-key from the rights object and use a binding key to decrypt the title pre-key to yield a title key. The binding key may include data uniquely associating the encrypted digital property instance with the secure anchor point.

19 Claims, 5 Drawing Sheets

ANCHOR POINT-BASED DIGITAL CONTENT PROTECTION

CROSS REFERENCE

This application claims priority to U.S. Provisional Patent Application No. 61/024,174, entitled ANCHOR POINT-BASED DIGITAL RIGHTS MANAGEMENT and filed on Jan. 28, 2008, which is specifically incorporated by reference for all that it discloses and teaches.

BACKGROUND

Digital property is an evolving economic and legal concept that challenges modern technological and legal frameworks. Generally, digital property refers to any digital data that has some manner of ownership attached to it, for example, through copyright protection, trade secret protection, etc. In a typical copyright scenario, copyrights in an original work of authorship (e.g., a photograph) may be attributed to the author (e.g., the photographer). Furthermore, the work may be embodied in the form of digital data (e.g., a digital image file), the copying, distribution, derivation, etc. of which are exclusively within the rights of the author. Accordingly, each instance of the digital data (e.g., each copy of the digital image file) is an instance of the digital property of that author.

The exclusive rights associated with digital property may be transferred (e.g., assigned to another) or licensed for use by others. For example, the photographer may license another party to use a digital image on the party's website, subject to certain limitations to which the parties have agreed. However, once the digital image file is copied and transferred out of the author's control, there is substantial risk of unauthorized copying, use, modification and distribution. Accordingly, Digital Rights Management (DRM) technologies are continually being developed to facilitate the owner's technological and legal control of his or her digital property rights.

However, existing DRM approaches have proven inadequate, costly, invasive, and inconvenient to the licensed users and/or digital property owners (e.g., being subject to technological breakdowns, such as computer crashes, resulting in a loss of a licensed copies), thereby limiting the widespread acceptance of these approaches. For example, a large digital music vending service recently announced its termination of music vending activities, raising the possibility that customers of the service may lose the ability to play the music that they "purchased".

Accordingly, digital property ownership remains exposed to violations of the owner's property rights (e.g., from theft of the digital property by others), and furthermore, consumers remain suspicious of protected digital property. These incompatible factors amplify the transactional costs associated with distributing digital content. In turn, digital property owners/publishers charge higher licensing fees to offset losses caused by digital property theft and consumers find the convenience of unauthorized digital content worth the ethical violations and possible criminal sanctions implicated by obtaining the content through theft. The cycle feeds on itself.

SUMMARY

Implementations described and claimed herein resolve the foregoing concerns by applying an enhanced "book" paradigm to digital property. The book paradigm increases the cost of unauthorized copying, distribution, etc. of digital content while increasing the convenience for a user wishing to obtain legal license to use the particular digital content. Continuing the book paradigm example, a user may purchase a book, which represents a user-owned physical object to which the licensed rights in the underlying work are attached. The user obtains certain rights to use the work embodied in the book upon the purchase. By binding the rights to a physical object, the copyright owner dramatically increases the difficulty to a potential infringer wishing to violate the copyright owner's retained rights. That is, generally, the embodiment of the property in the physical form of the book substantially limits use of the property to those contemplated under the license transferred to the user upon purchase of the book (i.e., to the physical possessor of the book). Granted, photocopiers and scanners may be used to circumvent these limitations, but generally, the inconvenience of employing such devices outweighs the transactional costs of merely purchasing the book.

By comparison, the technology described herein binds the transferred rights to a secure, unique, hard-to-falsify physical object (called an "anchor point"). In one implementation, the anchor point is owned by the user and allows the user access to digital property instances. In one implementation, an anchor point is embodied in a highly secure, robust circuit device. The rights are secured in association with the physical anchor point (e.g., the computing or storage device in which the anchor point resides) rather than any individual instance of the digital property—the rights are bound to a binding record maintained by the physical secure anchor point device.

The logical scope or "domain" in which an anchor point controls access to digital content is called the "anchor point domain". Absent the physical secure anchor point (e.g., outside of the anchor point domain), the digital property is unusable. Furthermore, traditional and future DRM approaches may be applied within an anchor point domain to manage the specific rights available, but the rights to use the digital property cannot easily leak outside the anchor point domain. Accordingly, the difficulty in mass digital property theft increases dramatically, which may encourage digital property publishers to lower prices.

In one implementation, the instance of the digital property is typically an encrypted digital data file, object, or stream. A content handler (e.g., a media player) can gain access to the digital property instance and present (e.g., play) it to a user within the rights granted in association with the secure anchor point. As such, the rights are managed through and bound to the secure anchor point device, rather than the digital property instance or some communication connection with a DRM service, thereby increasing the convenience to the user. For example, the user can make as many copies of the digital property instance as he or she wants, but each copy is only usable if the presentation device has access to unique binding data (e.g., statistically unique) managed by the secure anchor point to obtain the appropriate decryption key.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Digital data is inherently copy-able. Legitimate copying (i.e., under most licensing schemes) is allowable, for example, to use the digital data (e.g., copying from a hard disc into memory), to prevent loss (e.g., backing up the digital data to one or more types of storage media), to allow mobility (e.g., to transfer to a new computer, mobile device, etc.), etc. To balance a digital property owner's interests with a digital property user's interests, these legitimate copying considerations are preserved for the user while preserving secure technological control over the digital property for the owner. In one implementation, this continued control is achieved through use of a secure device referred to herein as an "anchor point".

An anchor point is a highly secure circuit device that may be incorporated into a computing device, such as a computer, a mobile phone, a hard drive, a monitor, an audio player or component, a set top box, a network appliance, a personal digital assistant (PDA), a television, a digital picture frame, a USB flash memory drive, etc. An anchor point can be part of a local consumer device or it can be provided by a remote server through an online service.

Figure 1:
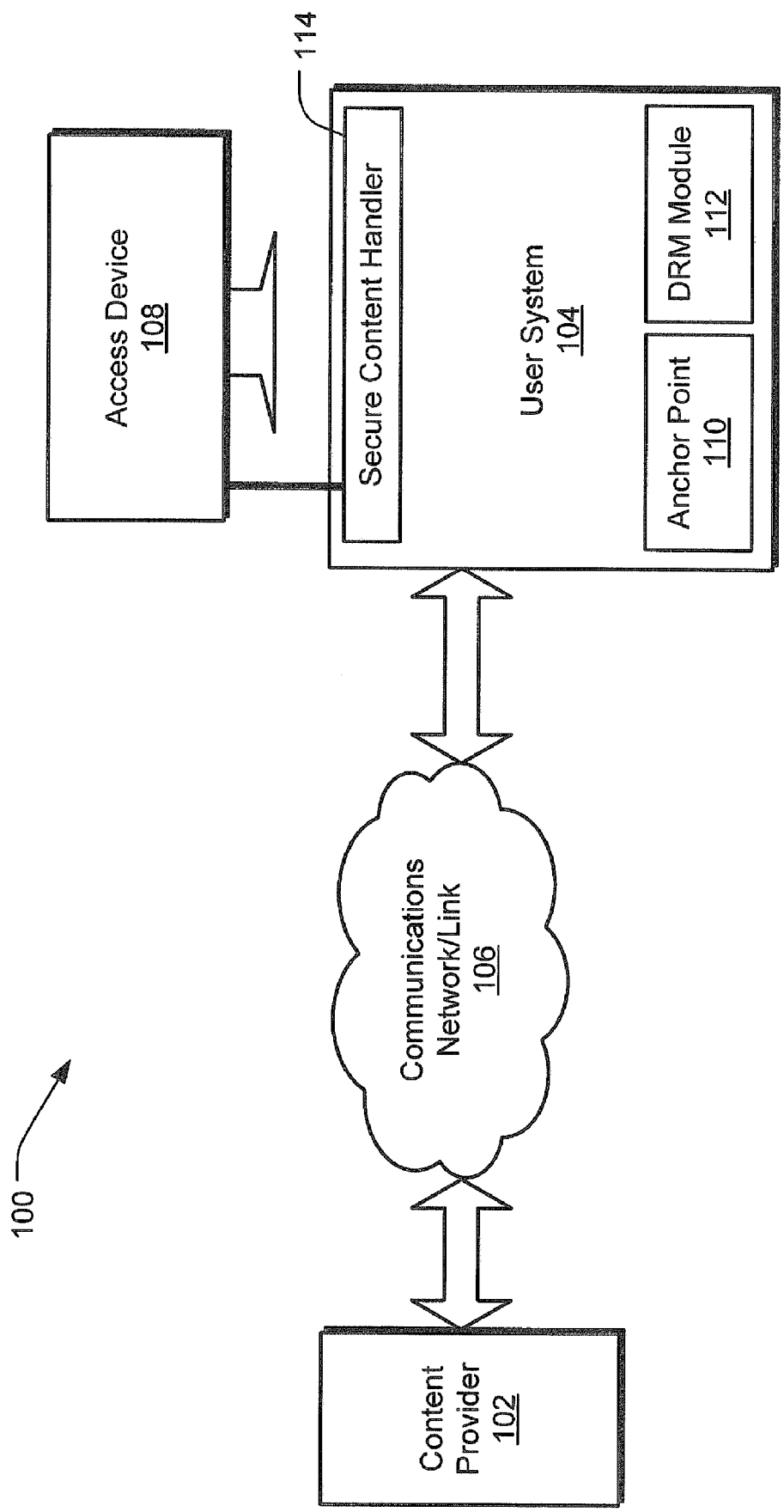
FIG. 1 illustrates an example digital property instance protection environment.

FIG. 1 illustrates an example digital property instance protection environment 100. A content provider 102, such as an online digital music or video rental service, an online digital music or video vending service, a digital music or video vending kiosk, etc., markets content for use by consumers. A common scenario includes a user system 104 that connects over a communications network 106, such as the Internet, to a service site, such as a website operated by the content provider 102. In an alternative implementation, the consumer connects a user system 104 (e.g., his or her mobile media player) through a communications link 106 directly to a vending kiosk operated by the content provider 102, such as by use of a USB cable or wireless connection (e.g., WiFi, BlueTooth, mobile phone technology, etc.).

Typically, a goal of the content provider 102 is to provide content (e.g., digital music, images, video, text, software, data, etc.) for the use by a consumer, subject to certain restrictions on use, copying, distribution, etc. Furthermore, the consumer typically intends to obtain the content for playing, viewing, and/or other allowable uses. For example, the consumer may wish to obtain a digital movie by downloading it from the content provider 102 to his or her user system 104 through the communications network 106 and then play the digital movie on the access device 108 connected to the user system 104.

Within the illustrated environment, the user system 104 includes a secure anchor point 110 that controls the consumer's ability to use the content. In one implementation, the content provider 102 interacts with the anchor point 110 to encrypt the content in such a way that the anchor point 110 is necessary for the decryption of the content for presentation to the consumer. The interaction is memorialized in the anchor point 110 in the form of a binding record stored securely within the anchor point 110.

The anchor point 110 in FIG. 1 is shown as a secure device in the user system 104, such as a microelectronics chip mounted on the motherboard of the user system 104, a microelectronics chip mounted in the hard disc drive installed in or accessible to the user system 104, etc. In alternative implementations, remote anchor points are implemented as anchor point services accessible by a user system 104.

The anchor point 110 interacts with the content provider 102 to establish a title key that is required to decrypt the content by the content provider 102 in an encrypted form under specified licensing terms. As such, when the user wishes to access the content received from the content provider 102, the anchor point 110 generates a title key based on the binding record and passes the title key to a secure content handler 114. In one implementation, access to the content received from the content provider 102 is further subject to licensing terms managed by a digital rights management (DRM) module 112 of the user system 104. The secure content handler 114 can use the title key to decrypt the content for presentation on the access device 108. In this manner, use (e.g., presentation) of the content depends upon the anchor point 110 and the binding record it maintains.

Figure 2:
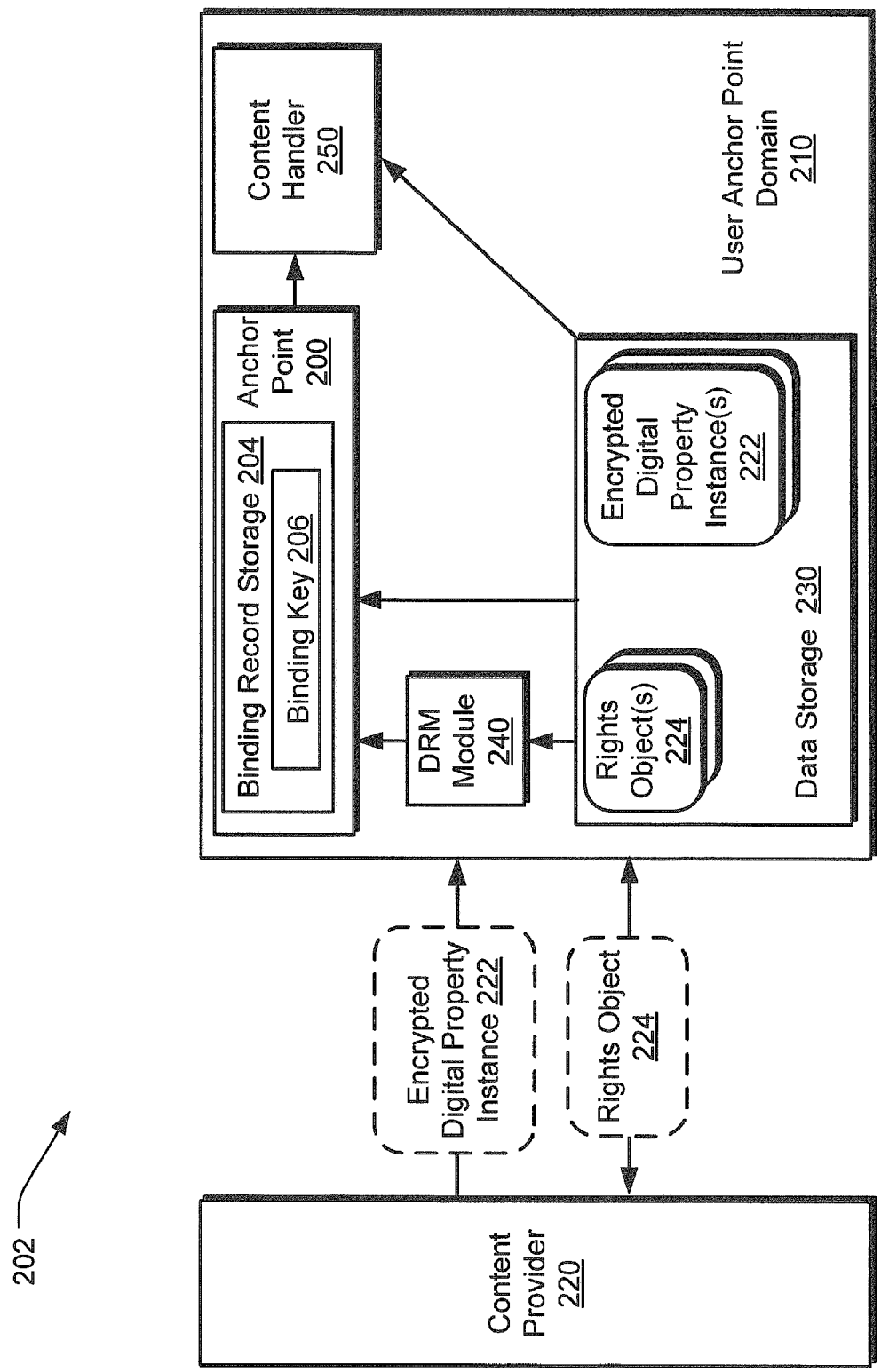
FIG. 2 illustrates an example application of an anchor point in a digital property instance protection environment.

FIG. 2 illustrates an example application of an anchor point 200 in a digital property instance protection environment 202. As depicted in FIG. 2, the digital property instance protection environment 202 includes a user anchor point domain 210 and a content provider 220. In one implementation, a user anchor point domain 210 may be defined in the context of whomever the user allows access to the user's anchor point 200, i.e. the constraints within which a digital property instance 222 may be freely accessed.

The user anchor point domain 210 and the content provider 220 can be communicatively linked to allow for transmission of an encrypted digital property instances 222 to the user anchor point domain 210. Communications to and from a user anchor point 200 are generally done through a secure communications link. Furthermore, aspects of the described technology still work if the security of the communications link is not robust between the content provider 220 and the anchor point domain 210. Particularly, other communications, such as communications of encrypted digital property instances 222, rights objects 224, general downloads, backups, etc., to the user's storage devices, work even if the communications link is not secure. Generally, a secure communications link to the anchor point 200 is characterized by authentication by public key certificate exchange, session key agreement, and subsequent communication using symmetric encryption, although other secure communications may also be employed. In one implementation mutual authentication is used.

The anchor point 200 as depicted in FIG. 2 includes binding record storage 204 which stores binding keys 206 that allow encrypted digital property instances 222 to be accessed in the user anchor point domain 210. In one implementation, the binding key 206 is stored in a binding record in the binding record storage 204. In such an implementation, the binding record in the anchor point may be secured with a binding record pass key and the location of the binding record may be indexed using a binding record identifier. Both the binding record identifier and the binding record passkey are also returned to the content provider 220 through the secure connection for embedding into a rights object 224. By way of example and not limitation, during acquisition of an encrypted digital property instance 222, the anchor point 200 receives a title key from the content provider 220 through a secure communications link and encrypts the title key using a binding key 206, randomly generated by the anchor point 200, to yield a title pre-key. The title pre-key is then returned to the content provider 220 to be incorporated into a rights object 224. By way of example and not limitation, during accessing an encrypted digital property instance 222, anchor point 220 can generate a title key through decryption of a title pre-key by the binding key 206. The title key is used to decrypt the encrypted digital property instance 222 thereby allowing a user to access (e.g. view, listen to, etc) the digital content received from the content provider 220.

The rights object 224 represents data uniquely associated with an encrypted digital property instance 222 and includes access data and usage rights for the encrypted digital property instance 222. The usage rights, generally associated with non-buy-to-own or temporary content, are a description of any constraints that are imposed on a user in accordance with a licensing scheme (e.g., maximum play counts, expiration times, etc.). Furthermore, access to the encrypted digital property instance 222 is limited to devices that can access the title key. The title key is accessible by applying the associated binding key 206 to a title pre-key stored in the rights object 224. In one implementation, the rights object 224 is specific to a DRM module 240 used within the user anchor point domain 210. The rights object 224 and encrypted digital property instance 222 are transmitted to the user anchor point domain 210 to be stored in the data storage 230.

Digital property instance 222 in FIG. 2 represents an instance of digital property, such as a digital image file, a digital video file, a digital audio file, etc. The digital property instance 222 may or may not be encrypted within the content provider 220. The digital property instance within the content provider 220 is encrypted using a title key prior to transmission to the user anchor point domain 210. Once encrypted, the encrypted digital property instance 222 can be downloaded or otherwise transferred to the user anchor point domain 210 without concern as to the presence of a secure communications link.

In the embodiment depicted in FIG. 2, the digital rights management (DRM) module 240 facilitates access by a user of the encrypted digital property instance 222 through processing the rights object 224 when the rights object 224 includes additional usage constraints (i.e. licensing rights definitions) not directly enforced by features of the anchor point 200. In one implementation, the DRM module 240 is a separate and distinct module than the anchor point 200 in the user anchor point domain 210. In another implementation, the functionality of the DRM module 240 is incorporated into the anchor point 200 or other components within the user anchor point domain 210. In yet another implementation, the DRM module 240 is absent. In such an implementation, no additional usage constraints are applied to the digital property instance 222 by the content provider 220. By way of example and not limitation, during acquisition of a digital property instance, the role of a DRM module 240 includes providing a cryptographic secret (e.g., a DRM key) to generate a license key by encrypting a title pre-key to be stored in a rights object 224. The rights object 224 including the licensing key also contains a definition of the licensed rights specific to the DRM module 240. In this manner, the DRM module 240 is involved in the eventual revelation of the title pre-key, without which the anchor point 200 cannot reveal the title key to allow the user to access the digital property instance 222 he or she has rightfully licensed. By way of example and not limitation, the licensing rights definition may limit access to the digital property instance 222 through, a play count limit, a time duration limit, a physical proximity to the anchor point 220 limit, etc.

Content handler 250 (e.g. content handler) in FIG. 2 processes and prepares the encrypted digital property instance 222 using the title key for access by the user. In one implementation, the content handler 250 receiving a title key from the anchor point 200 and the associated encrypted digital property instance 222 from data storage 230. The content handler 250 then decrypts the encrypted digital property instance 222 through application of the title key to yield a decrypted digital property instance. The content handler 250 then transmits the decrypted digital property instance to an access device to allow the user to access the digital property instance. For example, if the digital property instance 222 comprises an audio file then the content handler 250 transmits the audio file to audio outputs, such as speakers, headphones, audio visualization software, etc. In one implementation, the decrypted digital property instance is transmitted to the access device through a secure connection so as to avoid the possibility of access to the digital property instance 222 outside the user anchor point domain 210.

Figure 3:
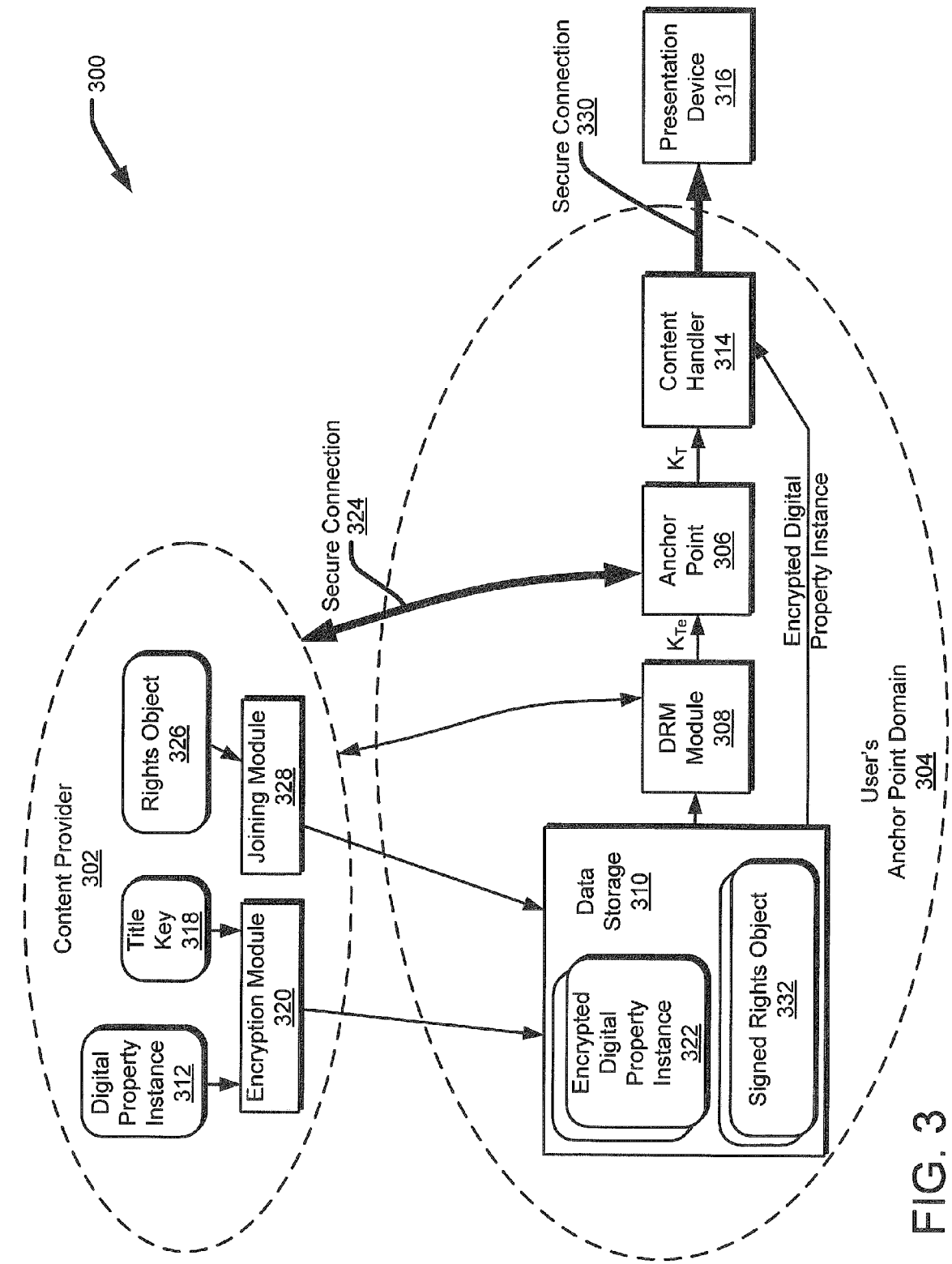
FIG. 3 illustrates an example architecture of digital property instance protection environment.

FIG. 3 illustrates an example architecture of digital property instance protection environment 300. A content provider operates in a secure environment 302, from which the content provider can create and issue content in the form of digital property instances. Generally, the content provider 302 interacts with a user's anchor point domain 304 to provide a uniquely encrypted digital property instance 322 and a signed rights object 332 associated with the encrypted digital property instance 322. The rights object 332 identifies an anchor point 306 binding record that may contain usage restriction information, and may also hold additional usage rights imposed upon the user. The rights object 332 manages access to the encrypted digital property instance 322.

In one implementation, within the user's anchor point domain 304, an anchor point 306, a DRM module 308, and data storage 310 work with the content provider 302 to prepare the uniquely encrypted digital property instance 322 and the signed rights object 332. Once the rights object 332 and encrypted property instance 322 are delivered the content provider 302 need not be involved, although in some implementations, the content provider 302 may become involved again in the future (e.g., to obtained updates to the digital property instance, to obtain replacements of the digital property instance, etc.).

In one implementation, after the encrypted digital property instance 322 and the rights object 332 are transferred to the user domain 304, the anchor point 306, the DRM module 308, and data storage 310 work together (without the need to contact the content provider 302) to generate a title key to allow a content handler 314 (e.g., a media player device or software module) to decrypt and a presentation device 316 (e.g., a video display, audio output system, etc.) to present (e.g., play or display) the digital content to the user.

Turning more specifically to the implementation illustrated in FIG. 3, assume the content provider receives a request from the user for specific content. The content (e.g., a digital video title) is a form of digital property that can be embodied in a digital property instance (e.g., a digital video file) from within the content provider 302. Typically, the user and content provider 302 will agree on the licensing terms of the transfer, which represents a broad range of possible transfers. For example, the user can request a 24 hour "rental" of a digital movie title or a perpetual license to play a digital audio title. A goal of the content provider 302 is to transfer an encrypted digital property instance 322 of the requested digital property instance to the user with confidence that the user will only be able to use the digital property instance in accordance with the agreed upon terms. A goal of the anchor point 306 is to define a self-limited sharing domain for the digital property instance, wherein the self-limiting is in the context that access and therefore sharing the digital property instance is facilitated to anchor point enabled devices.

In the first stage, that of transferring the digital property instance 312 and rights object 326 to the user domain 304, the content provider 302 chooses a random title key 318 ($K_T$), which is generally expected to be unique among all users and transferred digital property instances, even those associated with the same content title. In one implementation, the anchor point 306 provides a title key 318 along with the request for a digital property instance to the content provider 302 through a secure connection. The content provider 302 encrypts a digital property instance 312 with the title key 318 via an encryption module 320 to yield an encrypted digital property instance 322, which is communicated (e.g., downloaded) to the data storage 310 in the user domain 304 through wired networking, wireless networking, or physical means (e.g., "sneaker net").

The content provider 302 also contacts the anchor point 306 via a secure connection 324 to obtain a title pre-key. The anchor point 306 generates a title pre-key by encrypting the title key using a binding key. In one specific approach employed over a network, when the user initially requests the content title instance, the user provides a URL to the anchor point 306. The content provider 302 uses this URL to locate the anchor point 306 over the network and to establish the secure connection 324.

The content provider 302 then sends the title key 318 to the anchor point 306 through the secure connection 324. In one implementation, the content provider 302 sends the title key 318 using a create_binding( ) function. Responsive to receipt of the create_binding( ) call, the anchor point 306 generates a binding record, which may include data such as a binding record identifier (ID), a binding record passkey, a binding key, one or more signing keys, an output security level, etc. The anchor point 306 encrypts the title key using the binding key (randomly generated by the anchor point 306) to yield a first instance of a title pre-key ($K_{Te}$), which is returned to the content provider 302 via the secure connection 324. In one implementation, the anchor point 306 also sends the binding record ID and binding record passkey to the content provider 302 to be embedded in a rights object 326 that will be transmitted to the data storage 310 in the user domain 304. At this point, the content provider 302 no longer needs the title key and may delete it from its storage.

In one implementation, the content provider 302 also requests a DRM key from the DRM module 308 in the user domain 304. In such an implementation, the content provider 302 uses the DRM key to encrypt the first instance of title pre-key to yield a license key. The content provider 302 has a definition of licensed rights (e.g., in an XML file) to be associated with the transferred encrypted digital property instance 322 and embeds the license key, the binding record ID, and the binding record passkey into the licensed rights definition to yield a rights object 326. Secret information, such as passkeys, may be encrypted prior to being embedded into a rights object, encrypted by some user-supplied secret, so that the user has control over who can access the licensed content.

In one implementation, the rights object 326 is then sent to the anchor point 306 through the secure connection 324 to be signed by one of the anchor point's signing keys (e.g., which may be randomly generated by the anchor point 306). In one implementation, the signing key, which is uniquely known to the anchor point 306) applies a message authentication code (MAC) to the rights object 326. The anchor point's signature (e.g., the MAC) is then returned to the content provider 302 via the secure connection 324, joined to the rights object 326 by a joining module 328 to create a signed rights object 332, and transferred to the data storage 310 in the user domain 304.

The content provider 302 then ceases to interact with the user anchor point domain 304 as the content provider 302 participates in the creation and delivery of the digital property instance, but has no need to be involved in the user's use of the digital property instance 322—the user domain 304 has all it needs to use the digital property instance. Nevertheless, the content provider 302 may subsequently be invoked to provide beneficial services, including updating and/or replacing digital property instances, etc.

In a second stage, having obtained the encrypted digital property instance 322 and the signed rights object 332, and having generated a binding record in the anchor point 306, the user domain 304 can re-generate a title key required to present the content to the user. In one implementation, the DRM module 308 extracts the license key from the signed rights object 332 and decrypts the license key using the DRM module's DRM key to obtain a second instance of a title pre-key. The DRM module 308 can also extract the binding record ID and binding record passkey from the signed rights object 332. The DRM module 308 then passes the second instance of the title pre-key, binding record ID, and the binding record passkey to the anchor point 306 assuming the DRM module 308 can confirm compliance with the licensed rights defined in the signed rights object 332.

With the second instance of the title pre-key and the binding record information, the anchor point 306 can access the appropriate binding record that it has stored, in order to re-generate the title key using its binding key (e.g., the anchor point 306 decrypts the second instance of the title pre-key using the binding key to generate the title key) and can then pass the title key to the content handler 314 to allow decryption of the encrypted digital property instance 322 and presentation of the content by the presentation device 316.

In one implementation, the stream of title keys are presented to the content handler 314, which decrypts portions of the digital property instance using these keys. For example, a video file may require decryption by a new title key every 10 frames. As such, the anchor point 306 would provide a new title key every 10 frames to allow the content handler 314 to decrypt the next portion of 10 frames. It should be understood that, in one implementation, the DRM module 308 passes a stream of title pre-keys to the anchor point 306 to allow the anchor point 306 to pass a stream of title keys to the content handler 314.

It should also be noted, in one implementation, the DRM module 308 employs the anchor point 306 to check the signed rights object 332 to verify that the anchor point's most recent signature is contained within the signed rights object 332. This check guards against tampering with the rights object 332 that might defeat usage restrictions imposed by the DRM module 308. Also, the anchor point 306 re-signs the signed lights object 332 at each processing to update any changes to the licensed rights. For example, if the digital property instance is licensed for a total of fifty presentations, the DRM module 308 decrements the number of available presentations in the rights object 332 to reflect that a number of the available presentations that have been used. The anchor point 306 re-signs the rights object 332 using a modified signing key to make sure that the most updated version of the rights object is used by the DRM module 308.

At this point, the encrypted title instance 322 is retrieved from data storage 310 by the content handler 314, which decrypts the encrypted digital property instance 322 using the title key to yield a digital property instance that can be presented to the user via the presentation device 316 (connected to the content handler 314 through a secure connection 330).

In one alternative implementation, when setting up the binding, the content provider 302 generates a title pre-key, instead of a title key, and sends the title pre-key to the anchor point 306, which generates the title key and returns it to the content provider 302 for use in encrypting the digital property instance 312. In this implementation, the anchor point 306 decrypts the content provider-provided title pre-key using a binding key to obtain the title key which may be securely sent to the content provider 302 for use in encrypting the digital property instance 312. Then, during usage, when the user attempts to decrypt and present the encrypted title instance, the anchor point still receives the title pre-key from the DRM module and decrypts the title pre-key using its binding key to obtain the title key. In yet another alternative implementation, the anchor point 306 generates both the title key and the title pre-key, providing these to the content provider 302.

Figure 4:
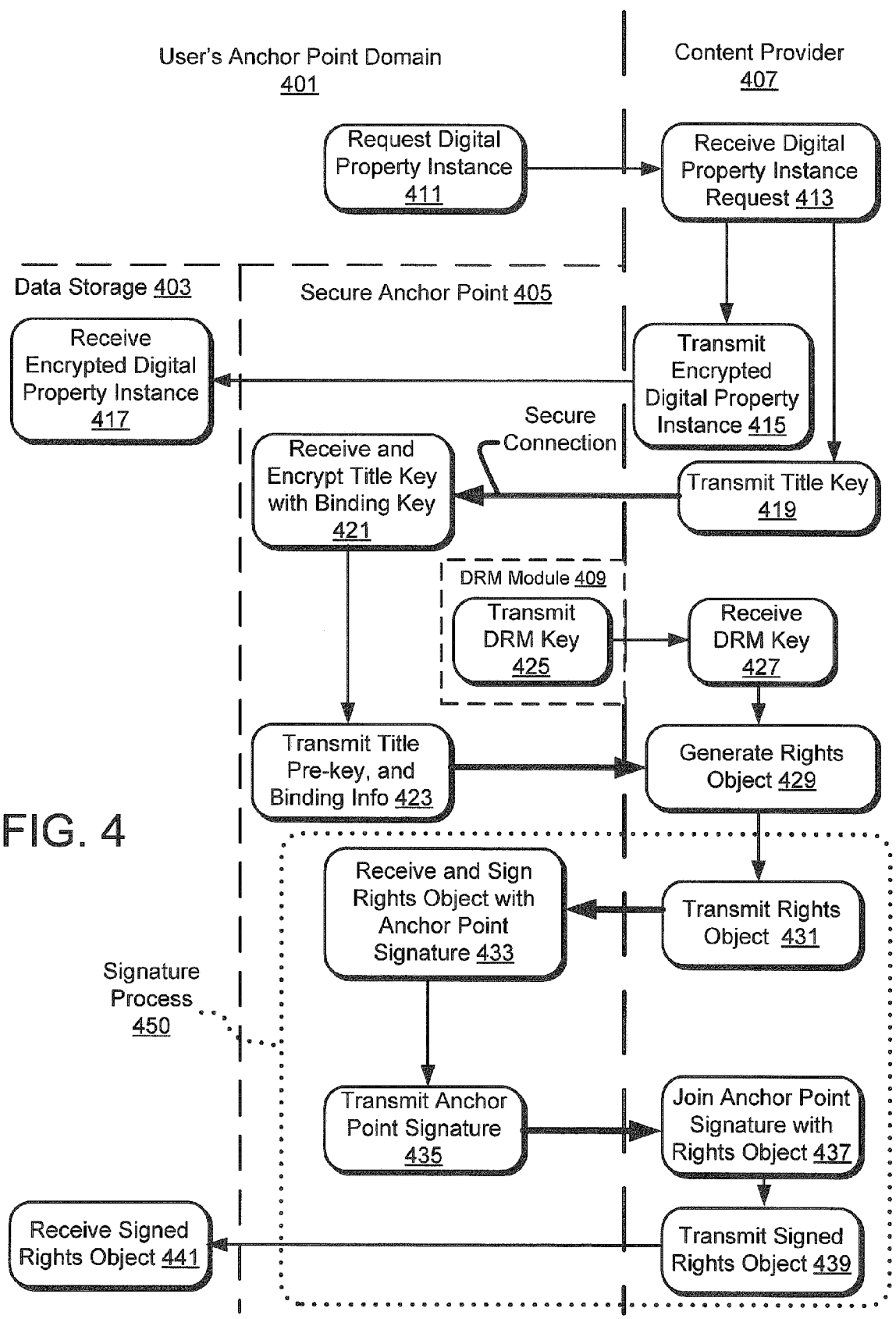
FIG. 4 illustrates example operations for acquiring transferring digital rights in a digital property instance to an anchor point domain.

FIG. 4 illustrates example operations for acquiring and transferring digital rights in a digital property instance to an anchor point domain 401. Generally, a user anchor point domain 401 acquires digital rights in a digital property instance to be stored in data storage 403, through use of an anchor point 405, and an optional DRM module 409, from a content provider 407. At operation 411, a user makes a request for a digital property instance from the user anchor point domain 401 to the content provider 407. The request is received at operation 413, and the content provider 407 encrypts a digital property instance using a title key to transmit to the data storage 403 at operation 415. At operation 417, the encrypted digital property instance is received in the data storage 417. The content provider 407 and the anchor point 405 establish a secure connection and transmit the title key used to encrypt the digital property instance at operation 419. In some embodiments, the secure connection is enabled because the user 401 includes the URL of the anchor point 405 in the initial request at operation 411. The content provider 407 then uses the received URL to establish a secure connection between the anchor point 405 and the content provider 407.

The title key is received by the anchor point 405 and encrypted using a binding key to yield a title pre-key at operation 421. The binding key used to encrypt the title key is stored in a binding record, indexed by a binding record identifier. In one implementation, permission to access the binding record is thereafter granted by a binding record pass key.

The title pre-key and binding information such as the binding record passkey and binding record identifier are transmitted to the content provider 407 at operation 423. Additionally, in one implementation, the DRM module 409 within the user domain transmits a DRM key at operation 425 that is received by the content provider 407 at operation 427. The content provider 407 uses the DRM key to encrypt the title pre-key to yield a license key The content provider 407 generates a rights object including the title pre-key and the binding record information at operation 429. In one implementation, the content provider 407 has a definition of licensed rights (e.g., in an XML file) to be associated with the transferred digital property instance and embeds the license key, the binding record ID, and the binding record passkey into the licensed rights definition to yield a rights object.

In one implementation, at this point in the acquisition process, the content provider 407 and anchor point 405 implement a signature process 450 to allow for additional functionality for any optional DRM usage constraints during use of the digital property instance. At operation 431 the rights object is transmitted to the anchor point 405. At operation 433 the anchor point receives and signs the rights object. At operation 435 an anchor point signature is transmitted to the content provider 407. The anchor point signature is joined to the right object at operation 437 to generate a signed rights object. The signed rights object is transmitted to the data storage 403 at operation 439, where it is received and stored at operation 441.

By way of example and not limitation, the anchor point signature is used to limit the number of times a digital instance is presented. As such, a changeable value in the rights object specifies a "play count". Before access to the digital property instance is allowed, the DRM module 409 checks to see if the play count has reached a maximum value yet. If not, then the DRM module 409 generates the title pre-key and sends it to the anchor point 405. However, before allowing such access, the DRM module 409 sends the original rights object (which was signed by the anchor point previously) and also sends a modified version of the rights object in which the play count has been incremented to the anchor point 405. The anchor point 405 checks the signature of the original rights object. If the signature is wrong, then the anchor point 405 returns an error message. If the signature checks, then the anchor point 405 computes a new signature for the modified rights object and returns that signature to be saved with the new rights object. The signing key used to sign the modified rights object is different than the signing key used to sign and check the original rights object. The anchor point 405 can randomly generate a new signing key for each new signature and saving, for example, only the most recent signing key in the binding record.

Figure 5:
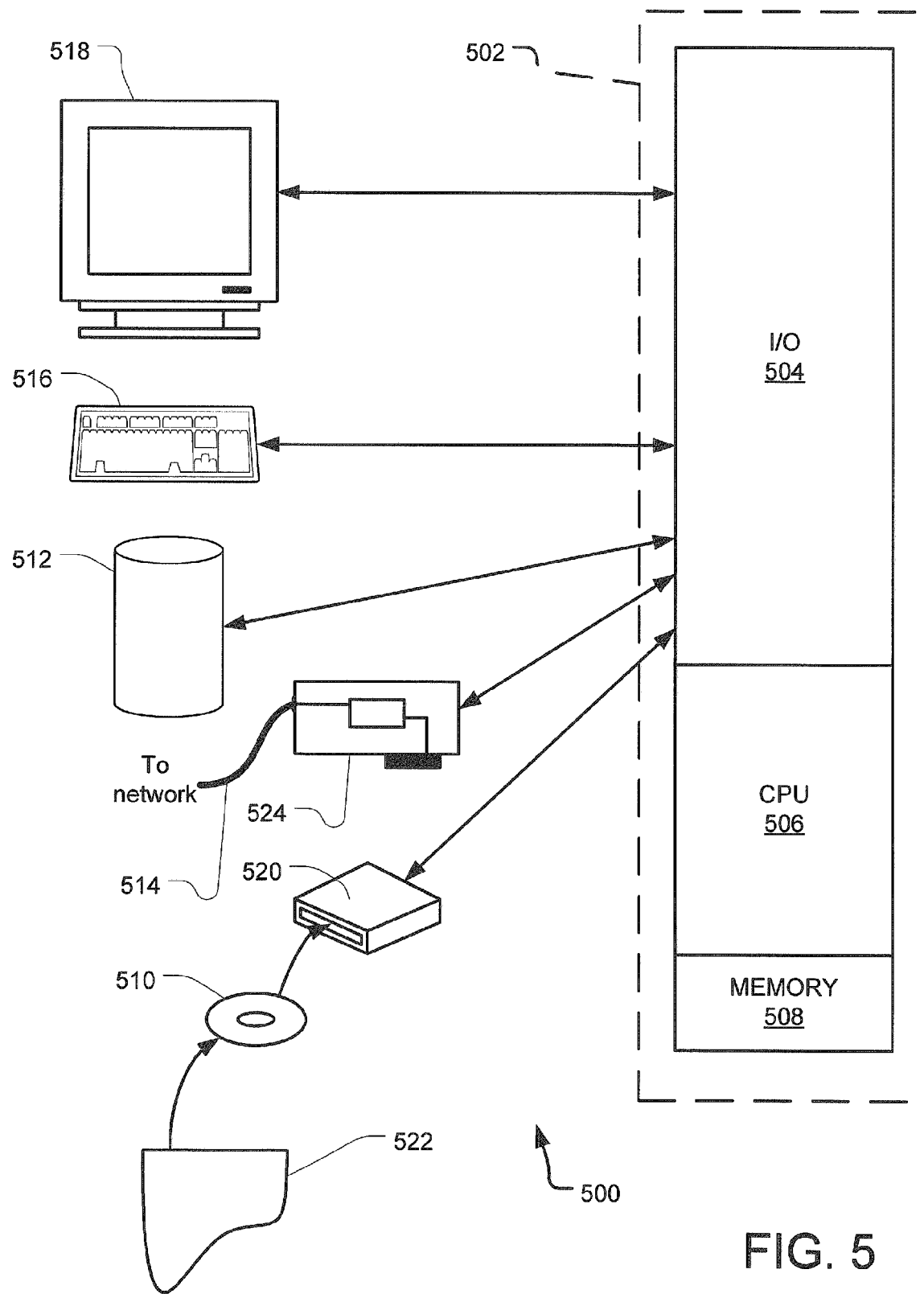
FIG. 5 illustrates an example system that may be useful in implementing the described technology.

FIG. 5 illustrates an example system that may be useful in implementing the described technology. A general purpose computer system 500 is capable of executing a computer program product to execute a computer process. Data and program files may be input to the computer system 500, which reads the files and executes the programs therein. Some of the elements of a general purpose computer system 500 are shown in FIG. 5 wherein a processor 502 is shown having an input/output (I/O) section 504, a Central Processing Unit (CPU) 506, and a memory section 508. There may be one or more processors 502, such that the processor 502 of the computer system 500 comprises a single central-processing unit 506, or a plurality of processing units, commonly referred to as a parallel processing environment. The computer system 500 may be a conventional computer, a distributed computer, or any other type of computer. The described technology is optionally implemented in software devices loaded in memory 508, stored on a configured DVD/CD-ROM 510 or storage unit 512, and/or communicated via a wired or wireless network link 514 on a carrier signal, thereby transforming the computer system 500 in FIG. 5 to a special purpose machine for implementing the described operations.

The I/O section 504 is connected to one or more user-interface devices (e.g., a keyboard 516 and a display unit 518), a disk storage unit 512, and a disk drive unit 520. Generally, in contemporary systems, the disk drive unit 520 is a DVD/CD-ROM drive unit capable of reading the DVD/CD-ROM medium 510, which typically contains programs and data 522. Computer program products containing mechanisms to effectuate the systems and methods in accordance with the described technology may reside in the memory section 504, on a disk storage unit 512, or on the DVD/CD-ROM medium 510 of such a system 500. Alternatively, a disk drive unit 520 may be replaced or supplemented by a floppy drive unit, a tape drive unit, a flash memory USB drive, or other storage medium drive unit. The network adapter 524 is capable of connecting the computer system to a network via the network link 514, through which the computer system can receive instructions and data embodied in a carrier wave. Examples of such systems include Power-PC and Intel-based computing systems offered by Apple Corp., personal computers offered by Dell Corporation and by other manufacturers of Intel-compatible personal computers, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 500 is connected (by wired connection or wirelessly) to a local network through the network interface or adapter 524, which is one type of communications device. When used in a WAN-networking environment, the computer system 500 typically includes a modem, a network adapter, or any other type of communications device for establishing communications over the wide area network. In a networked environment, program modules depicted relative to the computer system 500 or portions thereof, may be stored in a remote memory storage device. It is appreciated that the network connections shown are exemplary and other means of and communications devices for establishing a communications link between the computers may be used.

In an exemplary implementation, anchor points, DRM modules, content handlers, and other modules may be incorporated as part of the operating system, application programs, other program modules, or circuit components. Binding records, rights objects, digital property instances various encryption keys and other data may be stored as program data. In such an exemplary implementation, added protections may be needed to protect the secure anchor point functionality. For example, the host system may be placed in a secure location and may present the anchor point functionality remotely through a secure communication connection.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology and any tamper-resistant security additionally included. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method of acquiring a digital property instance, the method comprising:
    encrypting, via a user system configured to receive digital content over a network from a content provider, a first instance of a title key using a binding key to generate a title pre-key, the first instance of the title key being used to encrypt the digital property instance to generate an encrypted digital property instance;
    transmitting, from the user system, the title pre-key to a content provider;
    storing the binding key securely in a secure anchor point accessible to the user system; and
    receiving, at the user system, the encrypted digital property instance and the title pre-key from the content provider, wherein the title pre-key is decryptable by the binding key to generate a second instance of the title key for use in accessing the digital property instance.

2. The method of claim 1 further comprising:
    requesting the digital property instance from the content provider prior to encrypting the first instance of the title key.

3. The method of claim 1 further comprising:
    deleting the title pre-key and the first instance of the title key after transmitting the title pre-key to the content provider.

4. The method of claim 1 further comprising:
    transmitting a digital rights management key to the content provider, the digital rights management key being used to encrypt the title pre-key to generate a licensing key; and
    receiving a rights object from the content provider, the rights object being associated with the encrypted digital property instance and including the licensing key, wherein the licensing key is decryptable by the digital rights management key to generate the title pre-key.

5. The method of claim 1, wherein storing the binding key securely in a secure anchor point comprises:
    storing the binding key in a binding record in the secure anchor point; and
    requiring possession of a binding record pass key to provide access to the binding record; and
    permitting access to the binding record through a binding record pass key.

6. The method of claim 5 further comprising:
    transmitting a binding record identifier and the binding record pass key to the content provider, the binding record identifier configured to locate the binding record in the secure anchor point; and
    receiving a rights object from the content provider, the rights object including the title pre-key, the binding record identifier, and the binding record pass key.

7. The method of claim 1 further comprising:
    decrypting, via the secure anchor point, the title pre-key using the binding key to generate the second instance of the title key; and passing the title key to a secure content handler, the secure content handler using the title key to access the digital property instance.

8. A method for managing access to an encrypted digital property instance, the method comprising:
extracting a title pre-key from a rights object associated with the encrypted digital property instance, wherein a first instance of a title key was used to encrypt the encrypted digital property instance;
decrypting the title pre-key using a binding key to generate a second instance of the title key, wherein the binding key is stored securely within a secure anchor point;
decrypting the encrypted digital property instance using the second instance of the title key to generate a decrypted digital property instance;
extracting a binding record pass key from the rights object;
requiring possession of the binding record pass key to provide access to the binding record; and
extracting the binding key from the binding record.

9. The method of claim 8 further comprising:
transmitting the decrypted digital property instance to a presentation device through a secure connection.

10. The method of claim 8 further comprising:
extracting a licensing key and a licensing rights definition from the rights object;
requiring possession of a digital rights management key to provide access to the licensing rights definition; and
decrypting the licensing key using the digital rights management key to generate the title pre-key.

11. The method of claim 10, wherein the licensing rights definition includes predefined limits on access to the encrypted digital property instance.

12. A secure anchor point based digital property instance protection system, the system comprising:
data storage that stores a rights object associated with an encrypted digital property instance, the rights object including a title pre-key, the encrypted digital property instance being encrypted by a content provider with a first instance of a title key, the first instance of the title key being encrypted with a binding key to yield the title pre-key;
a secure anchor point communicatively coupled to receive the title pre-key stored in the data storage and configured to decrypt the title pre-key using the binding key to yield a second instance of the title key, the first instance of the title key being deleted after the binding key is stored in the secure anchor point; and
a content handler communicatively coupled to receive the second instance of the title key from the secure anchor point and to receive the encrypted digital property instance from the data storage, the content handler being further configured to decrypt the encrypted digital property instance using the second instance of the title key.

13. The system of claim 12 further comprising:
a presentation device communicatively coupled to receive the encrypted digital property instance decrypted by the content handler from the content handler through a secure connection.

14. The system of claim 12 wherein the rights object includes a licensing key, the title pre-key being encrypted by the content provider with a digital rights management key to yield the licensing key; and further comprising:
a digital rights management module communicatively coupled to receive the rights object from the data storage and configured to decrypt the licensing key using the digital rights management key to yield the title pre-key.

15. The system of claim 14, wherein the rights object further includes a licensing rights definition configured to control access to the digital rights management key.

16. The system of claim 15, wherein the licensing rights definition includes predefined limits on access to the encrypted digital property instance.

17. The system of claim 12, wherein the secure anchor point receives the first instance of the title key through a secure connection.

18. The system of claim 12, wherein the content handler receives the second instance of the title key from the secure anchor point through a secure connection.

19. The system of claim 12, wherein:
the secure anchor point is configured to store the binding key in a binding record, the binding record being encrypted with a binding record pass key;
the rights object further includes the binding record pass key, the binding record pass key being included by the content provider into the rights object; and
the secure anchor point is further configured to require possession of the binding record pass key to provide access to the binding record.

* * * * *